United States Patent [19]
Wallace

[11] 3,961,426
[45] June 8, 1976

[54] PORTABLE STAGE ASSEMBLY

[76] Inventor: Brad Wallace, 7941 Broughton St., Sarasota, Fla. 33580

[22] Filed: June 3, 1974

[21] Appl. No.: 476,094

[52] U.S. Cl. .................................. 35/16; 46/13
[51] Int. Cl.² ..................................... G09B 19/00
[58] Field of Search .................. 35/16, 51, 60, 7 A; 46/13; 40/142 A

[56] References Cited
UNITED STATES PATENTS

| | | | |
|---|---|---|---|
| 1,281,623 | 10/1918 | Martin | 46/13 |
| 1,450,850 | 4/1923 | Grip | 46/13 X |
| 1,600,554 | 9/1926 | Marquis | 46/13 X |
| 1,990,671 | 2/1935 | Redington | 46/13 UX |
| 2,083,597 | 6/1937 | Edelman | 46/13 X |
| 2,283,104 | 5/1942 | Surman | 46/13 |
| 2,662,353 | 12/1953 | Bergman | 40/142 A UX |
| 2,760,275 | 8/1956 | Stein | 35/16 |
| 3,618,175 | 11/1971 | Lindberg | 35/60 X |
| 3,785,065 | 1/1974 | Kamm | 35/16 |

*Primary Examiner*—Harland S. Skogquist
*Attorney, Agent, or Firm*—Stein, Orman & Pettis

[57] ABSTRACT

A model, portable stage assembly capable of being disassembled and operatively assembled so as to predetermine the design of an intended set including the arrangement of various model furniture or other scaled down set elements. The assembly comprises a stage means including a relatively soft, penetrable surface on which a plurality of set elements can be positioned and rearranged by contact means in the form of pins or the like serving to penetrate the surface and thereby be fixedly positioned in a determined area. Housing wall elements, backdrop elements including side curtains and a facing are all movably connected to the stage base and floorings in an adjustable predetermined relation to one another so as to allow the arrangement or predetermination of a set design on a scaled down basis.

6 Claims, 5 Drawing Figures

PORTABLE STAGE ASSEMBLY

BACKGROUND OF THE INVENTION

1. Field of the Invention

This invention relates to a miniaturized, model and portable stage assembly comprising a plurality of detachably connectable elements disposed in predetermined arrangement to one another so as to determine the desired or selected stage design.

2. Description of the Prior Art

In virtually all levels and form of theatrical performances a preliminary, basic and primary consideration is the actual design of the set or sets utilized in the various sketches of the performance. During presentation, an effective set design can frequently be as important to a successful performance as the abilities and presentations of the actors.

Previously, the determination of the desired set design including the arrangement of various furniture and/or props utilized on an intended set were most likely determined by the physical rearrangement of the actual furniture or props utilized. It is obvious that determination of set design in this manner has inherent drawbacks and certainly lacks versatility when an unusual piece of furniture or prop is required. It must be assumed that stage designers certainly utilize basic techniques such as diagraming, intended arrangements, locations and overall set designs prior to physical arrangement of the actual pieces utilized on the set. The obvious disadvantages of such technique is the inability to picture the three dimensional appearance of the desired set.

Prior art "model assemblies" do, of course, utilize miniaturized furniture, room interiors, desired properties and the like. However, the majority of these prior art devices are not specifically intended for set design in that the entire stage including backdrops, side curtains and walls, stage flooring and facings are required to give the set designer the full appearance of the set design as actually visualized on stage by the audience. In addition, functional qualities of the set design can best be determined by viewing the total embodiment of the stage including the facing, flooring, backdrops, etc.

In order to most efficiently accomplish effective set design, it can be seen that there is a need for set designers and others involved with theatrical production for a model stage assembly capable of determining, in scale, the precise desired arrangement and relative position of furniture, props, backdrops, etc. to one another and to the entire perspective of the stage area itself.

SUMMARY OF THE INVENTION

This invention relates to a model, portable stage assembly specifically configured, designed and dimensioned to make possible the determination of desired set design through a visualization of the entire stage appearance.

More specifically, the stage assembly comprises a stage means including a supporting base having a substantially flat, planar configuration designed to rest on any applicable supporting surface. The stage means further comprises a stage flooring means including a basic frame configuration which may be correspondingly configured to the supporting base of the stage means itself. The flooring means further includes a relatively soft, penetrable surface ideally made from a cork or like material. The term "penetrable" is herein meant to include any applicable surface capable of being penetrated by a pin, tack or like attachment element which may be connected to model furniture or properties. This, of course, allows the model furniture or properties to be rearranged relative to one another about the stage flooring which represents the stage itself.

Alternately, the structure of the flooring means of the surface may be modified to include other securing means. Such securing means may take the form of a magnetic surface whereby model figurations or properties may be secured to the flooring means by magnetic attraction.

Housing means comprising back and side wall elements are movably interconnected to one another and disposed adjacent or contiguous to the stage flooring or the stage base. Movably interconnecting the various wall elements allows for versatility in configuration of the housing means thereby allowing it to adapt to any desired set configuration selected or predetermined by the set designer. The housing means, again because of its movably or pivotally mounted wall element is normally positioned at least in partially surrounding relation to the flooring means and, when not in use, the wall elements may be folded over upon itself because of its flat, substantially planar configuration. This, of course, provides easy storage and transporting of the housing means in cooperation with the other structural elements of the stage assembly.

A first connector means including magnetic connector elements is disposed in interconnecting relation between the stage means and the housing means so as to position these two elements relative to one another as desired. The use of a magnetic connector element also allows for easy disassembly when desired.

Brace means in the form of an elongated rod is disposed substantially adjacent to the front viewing portion of the stage means and in upwardly spaced relation thereto. More particularly, the elongated rod comprising the brace means is attached adjacent its opposite ends to oppositely disposed wall elements of the housing means. Second connector means are mounted on the brace means substantially adjacent its opposite end or at any desired or applicable location and are connected in substantially supporting relation to a facing means which itself is interconnected between the housing and the stage means.

The facing means itself is a partial frame-like structure disposed to visually represent the sod or facing to the "would be" audience wherein sufficient space or open area is provided or defined by the facing such that the actual set may be viewed therethrough. The positioning of the facing means contiguous to the viewing front of the assembly serves to locate the stage assembly on the interior of the housing means and further disposed in at least partially surrounding relation to the housing and facing means.

Backdrop means are mounted in suspended relation to support means in the form of elongated support elements interconnected between oppositely disposed wall elements of the housing. In this manner, the backdrop means extends downwardly and are suspended into the "interior" defined by the at least partially surrounding configuration of the wall elements of the housing relative to the stage means. Attachment means serve to interconnect the backdrop means to the support means and are movable along the longitudinal axis of the support elements themselves so as to readily accomplish selective positioning of the various backdrop means in the desired location relative to the flooring means of the stage. The backdrop means itself may include one or more backdrop elements and/or one or more side curtains.

Orienting means in the form of a plurality of notches are arranged along the top, peripheral edge of oppositely disposed wall elements. Cooperating pairs of notches are correspondingly positioned relative to one another on each of the oppositely disposed wall elements such that the individual support elements may be arranged in spaced relation to one another in substantially parallel or alternately angular relation relative to one another. More specifically, the notches are disposed to supportingly engage opposite ends or extremities or portions adjacent thereto of the support element.

The invention accordingly comprises the features of construction, combination of elements and arrangement of parts which will be exemplified in the construction hereinafter set forth and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION

Figure 1:
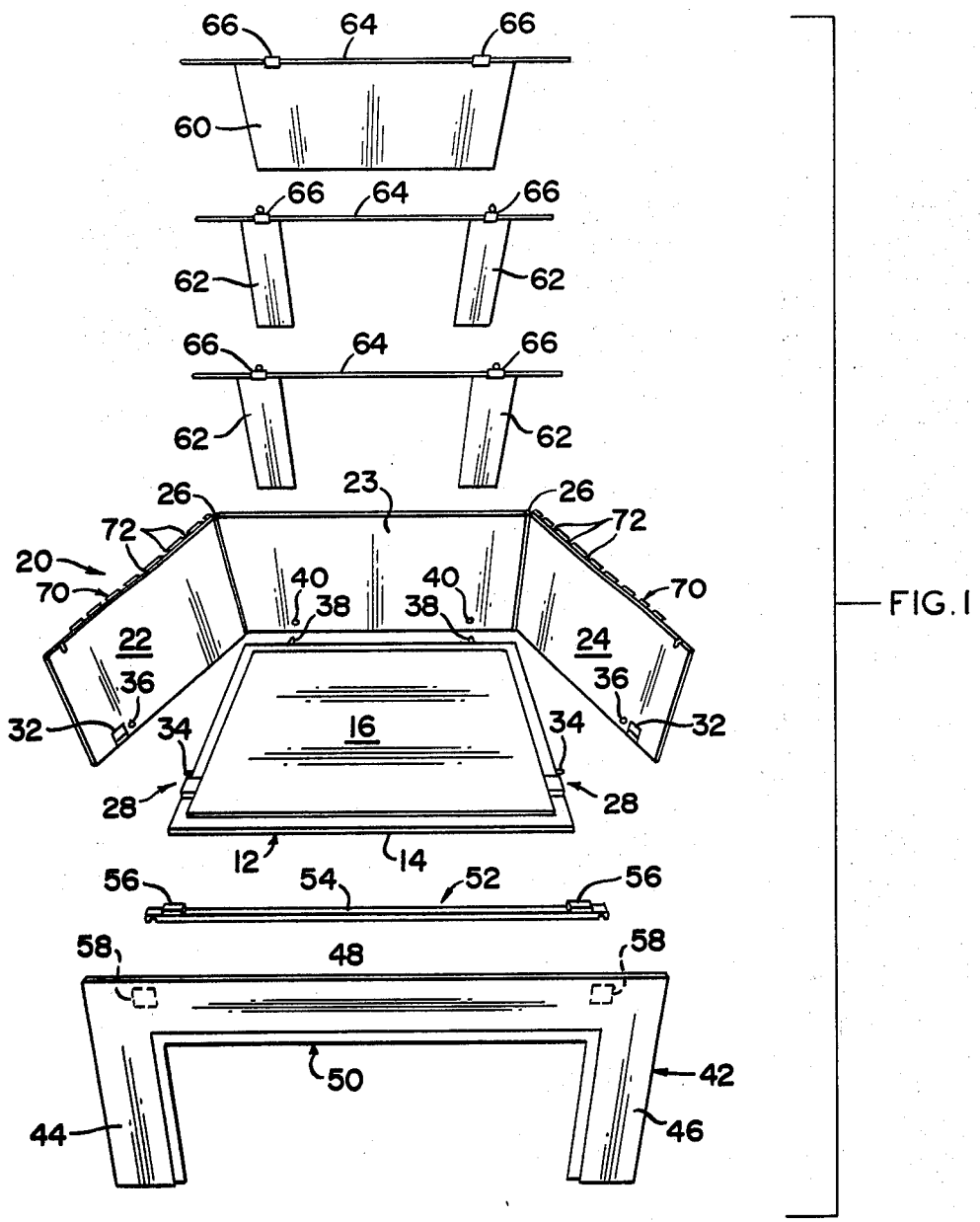
FIG. 1 is an exploded view of the various structural elements comprising a stage assembly in unassembled but relatively positionable relation to one another.
Figure 2:
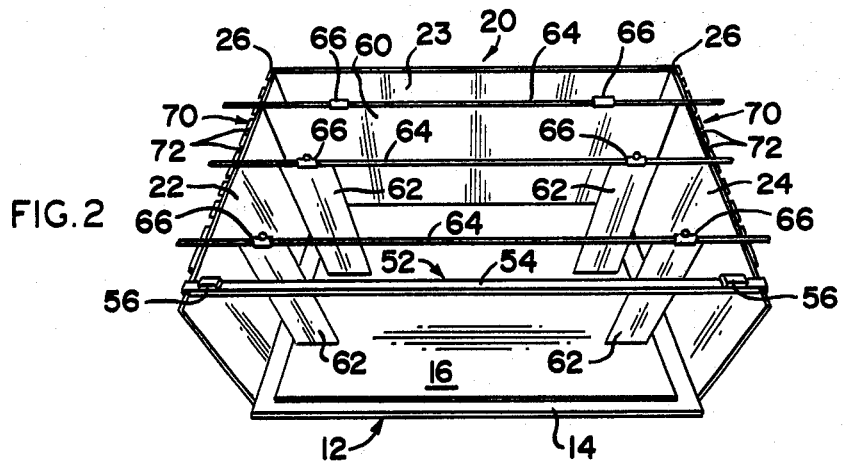
FIG. 2 is a top view showing the interior of the housing means, stage means and relative relation of the backdrop thereto.
Figure 3:
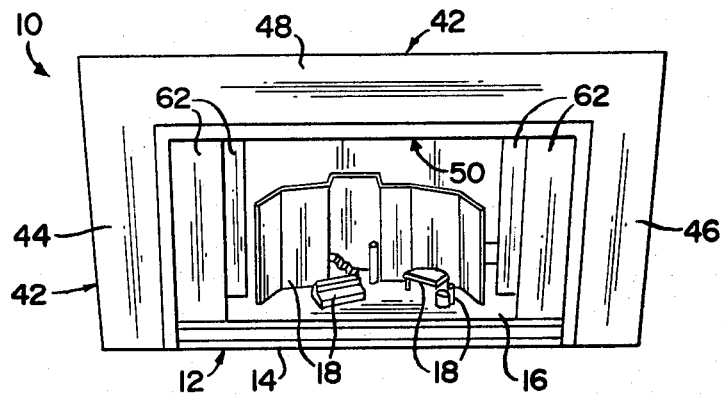
FIG. 3 is a front perspective view of the stage assembly and its structural element in operatively assembled form.

The present invention relates to a stage assembly generally represented as 10 in assembled form in FIG. 3. The stage assembly comprises a stage means generally indicated as 12 (FIG. 1) including a stage base 14 and flooring means 16. As best shown in FIGS. 1 and 2, the flooring means comprises a relatively soft, penetrable surface capable of being penetrated by any attachment elements connected to the model size furniture or properties 18 (FIG. 3).

Figure 5:
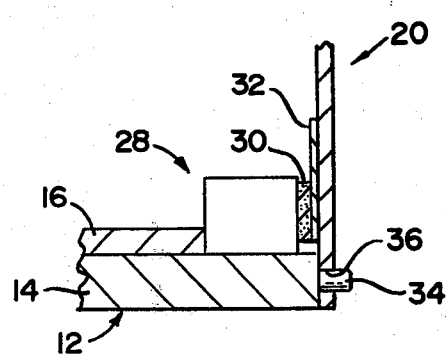
FIG. 5 is a detailed view of the connector means of the present invention.

Housing means generally indicated as 20 comprises a plurality of wall elements 22, 23 and 24, each movably connected to one another by a hinge attachment or like means 26. By virtue of this hinge attachment the various elements 22, 23 and 24 are positionable in contiguous relation to both the base 12 and flooring means 16 about at least a portion of its periphery and in at least partially surrounding relation to the flooring means 16. First connector means 28, shown in detail in FIG. 5, is disposed in interconnecting relation between the stage means 12 and the correspondingly positioned wall element of the housing means 20. More particularly, the first connector means includes a magnetic element 30 positioned in cooperative relation to a metal or like plate 32 formed from a magnetically attractable material. This plate 32 is mounted on an appropriately positioned portion of wall element 24 as indicated. In addition, the first connector means includes tit element 34 designed to protrude or project through aperture 36.

Similar tit and aperture combinations 38 and 40 respectively, may be located at spaced relations to one another about the corresponding peripheries of both the stage means and the housing means as best shown in FIG. 1.

As best shown in FIGS. 1 and 3, the model stage assembly of the present invention further comprises a facing means generally indicated as 42 including a partial frame structure having vertically extending portions 44 and 46 and an overhang interconnecting portion 48. An aperture or space 50 is provided on the "interior" of the framing means so as to provide proper viewing (FIG. 3) of the "set" positioned on flooring 16 and at least partially defined on the interior of wall elements 22, 23 and 24.

Brace means generally indicated as 52 comprises an elongated rod 54 extending in interconnecting relation between wall elements 22 and 24 adjacent the viewing front of the stage assembly as best shown in FIG. 2. Second connector means 56 are mounted on or adjacent to opposite ends of elongated rod 54 and are correspondingly positioned relative to metallic or like material plates 58 on the facing means 42 as shown. The operation and structural similarity of second connector means 56 is essentially the same as the first connector means explained with specific reference to FIG. 5. More specifically, facing 42 is held in substantially supported relation being interconnected between stage means 12 and wall elements 22 and 24 by virtue of its connection with brace means 54 and their particular second connector means 56.

Backdrop means comprises one or more backdrop elements 60 and/or 62 mounted on supporting means 64 comprising a plurality of elongated support elements as indicated. Attachment means 66 serve to interconnect each of the backdrop elements 60 and/or 62 to the support elements 64 and are movable along the longitudinal axis thereof. This accomplishes selective and efficient positioning of the elements 60 and/or 62 in a suspended manner relative to the stage flooring 16 and wall elements 22, 23 and 24.

Figure 4:
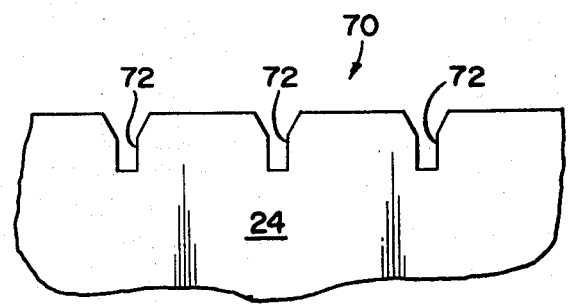
FIG. 4 is a detail view of the orienting means of the present invention.

With specific reference to FIG. 4, orienting means generally indicated as 70 includes a plurality of notches 72 formed in the upper peripheral edge of oppositely disposed wall elements 22 and 24. For the sake of brevity, the notches 72 will be particularly disclosed and described with reference to their positioning or mounting on wall element 24. It should be noted, however, that the duplicate structure is present on the upper longitudinal peripheral edge of wall element 22. These notches serve to engage opposite extremities or portions adjacent the extremities of support elements 64 and thereby position the support elements 64 in spaced parallel relation to one another as shown in FIG. 2. Alternatively, the support element 64 could be arranged in angular relation to one another to accomplish the desired prearrangement or effect of the backdrop elements 62 and/or 60 relative to one another and the wall elements 22, 23 and 24.

It will thus be seen that the objects made apparent from the preceding description are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall therebetween.

Now that the invention has been described, what is claimed is:

1. A model stage assembly of the type utilized to create a predetermined set design, said stage assembly comprising: stage means comprising a substantially flat, planar configuration, housing means connected to said stage means and disposed contiguous to at least a portion of the periphery of said stage means, first connector means disposed in interconnecting relation to said stage means and said housing means, said first connecting means including a magnetic element and a metallic plate both interconnected between said stage means and said housing means, said first connector means further comprising a tit means and an aperture means also interconnected between said stage means and said housing means, said tit means disposed in aligned relation with said aperture means and engaged therein when said housing means is mounted on said stage means, said stage means further including floor means; backdrop means disposed in cooperative relation to said housing means and said floor means and facing means disposed adjacent to the viewing front of said stage assembly, whereby replicas of intended stage arrangements can be determined upon operative positioning of said stage assembly, said housing means comprising three wall elements each comprising a substantially flat, planar configuration and each being pivotally attached in successive relation and thereby disposable in foldable, substantially overlapping relation to one another, said three wall elements mountable about three consecutively positioned peripheral portions of said stage means and disposed in substantially perpendicular relation to the plane of said stage means, said facing means mounted along a front peripheral portion of said stage means in substantially interconnecting relation to free ends of said interconnected three wall elements comprising said housing means; orienting means comprising a plurality of notches disposed in substantially equidistant spaced relation along the upper longitudinal edge of each of two of said three wall elements which are operatively disposed relative to one another, support means connected in supported relation at opposite ends thereof to said two oppositely disposed side wall elements, said support means disposed to position opposite extremities thereof in correspondingly positioned notches on each of said two oppositely disposed side wall elements respectively; attachment means movably mounted along the length of said support means, said backdrop means having one end thereof removably connected to said attachment means and thereby disposed in downwardly extending, suspended relation from said support means, and in substantially surrounding relation to said three wall elements, said backdrop means disposed relative to said stage means and said three wall elements so as to be viewable through said facing means.

2. A model stage assembly as in claim 1 wherein said floor means comprises a penetrable surface formed from a material capable of being penetrated by attachment means.

3. A model stage assembly as in claim 1 further comprising set means including at least one set element, each set element removably mounted on said floor means and penetrable in said floor means surface.

4. A model stage assembly as in claim 1 wherein said facing means is disposed in interconnecting relation between said stage means and said housing means, brace means mounted on said housing means in supporting engagement with said facing.

5. A model stage assembly as in claim 4 wherein said brace means comprises an elongated rod attached in supported relation to oppositely disposed wall elements of said housing means, second connector means mounted on said brace means and disposed to interconnect said housing means and said facing means.

6. A model stage assembly as in claim 5 wherein said second connector means comprises at least one magnetic connector element engaging said facing in supporting relation thereto.

* * * * *